(12) United States Patent
Düser

(10) Patent No.: US 9,108,732 B2
(45) Date of Patent: Aug. 18, 2015

(54) CARRYING SYSTEM FOR RECEIVING OF CONTAINERS IN A VEHICLE AND USE OF A CARRYING SYSTEM IN AN AIRCRAFT

(75) Inventor: Gerd Düser, Jork (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/472,707

(22) Filed: May 16, 2012

(65) Prior Publication Data

US 2012/0280011 A1    Nov. 8, 2012

Related U.S. Application Data

(63) Continuation of application No. PCT/EP2010/067561, filed on Nov. 16, 2010.

(60) Provisional application No. 61/261,803, filed on Nov. 17, 2009.

(30) Foreign Application Priority Data

Nov. 17, 2009    (DE) .......................... 10 2009 053 584

(51) Int. Cl.
*B64C 1/22*      (2006.01)
*B64D 11/00*     (2006.01)
*B64D 11/04*     (2006.01)
(Continued)

(52) U.S. Cl.
CPC ............ *B64D 11/0007* (2013.01); *B62B 3/003* (2013.01); *B64D 11/04* (2013.01); *B62B 5/0003* (2013.01); *B62B 2204/02* (2013.01); *B62B 2204/04* (2013.01)

(58) Field of Classification Search
USPC ....................................... 244/118.1
See application file for complete search history.

(56) References Cited

U.S. PATENT DOCUMENTS 3,517,899 A *   6/1970   Vernon ........................... 186/40
3,553,675 A     1/1971   Shaver et al.
4,397,159 A *   8/1983   Dodd ............................... 62/382
(Continued)

FOREIGN PATENT DOCUMENTS

CN    101442221 A    5/2009
DE    3783841 T2     5/1993
(Continued)

OTHER PUBLICATIONS

Chinese Office Action for Application No. 201080052131.4 dated Mar. 4, 2014.
(Continued)

*Primary Examiner* — Tien Dinh
*Assistant Examiner* — Justin Benedik
(74) *Attorney, Agent, or Firm* — Lerner, David, Littenberg, Krumholz & Mentlik, LLP

(57) ABSTRACT

A carrying system for receiving containers in a vehicle includes at least one container, at least one electrical consumer arranged in the container, at least one primary winding in a first core and at least one secondary winding in a second core. The secondary winding is arranged in the container, and the primary winding can be attached on the vehicle side in such a manner that movement of the container to a receiving position results in alignment of the primary winding and the secondary winding. The primary winding and the secondary winding are adapted for inducing in the secondary winding an alternating voltage that is applied to the electrical consumer.

9 Claims, 8 Drawing Sheets

(51) Int. Cl.
*B62B 3/00* (2006.01)
*B62B 5/00* (2006.01)

(56) References Cited

U.S. PATENT DOCUMENTS

| | | | |
|---|---|---|---|
| 4,428,078 A | 1/1984 | Kuo | |
| RE32,176 E * | 6/1986 | Vernon | 244/118.5 |
| 4,833,337 A | 5/1989 | Kelley et al. | |
| 4,853,555 A | 8/1989 | Wheat | |
| 4,914,539 A | 4/1990 | Turner et al. | |
| 5,264,776 A | 11/1993 | Hulsey | |
| 5,322,244 A * | 6/1994 | Dallmann et al. | 244/118.5 |
| 5,323,099 A | 6/1994 | Bruni et al. | |
| 5,696,409 A | 12/1997 | Handman et al. | |
| 5,759,005 A * | 6/1998 | Roessner et al. | 414/280 |
| 5,856,710 A | 1/1999 | Baughman et al. | |
| 5,890,779 A | 4/1999 | Blackburn et al. | |
| 5,959,433 A * | 9/1999 | Rohde | 320/108 |
| 6,008,547 A | 12/1999 | Dobler et al. | |
| 6,057,668 A | 5/2000 | Chao | |
| 6,152,287 A * | 11/2000 | Luria | 198/465.1 |
| 6,222,443 B1 | 4/2001 | Beeson et al. | |
| 6,340,136 B1 * | 1/2002 | Luria | 244/118.1 |
| 6,454,208 B1 * | 9/2002 | Nervig et al. | 244/118.1 |
| 6,590,190 B1 * | 7/2003 | Simeray | 219/626 |
| 7,030,760 B1 | 4/2006 | Brown | |
| RE39,551 E * | 4/2007 | Speranza | 221/1 |
| 7,432,622 B2 | 10/2008 | Griepentrog et al. | |
| 7,543,490 B2 | 6/2009 | Rey et al. | |
| 7,627,288 B2 | 12/2009 | Iida | |
| 8,076,620 B2 * | 12/2011 | Maupin et al. | 219/621 |
| 8,198,754 B2 | 6/2012 | Iisaka et al. | |
| 2002/0132589 A1 | 9/2002 | Kojima et al. | |
| 2003/0003971 A1 | 1/2003 | Yamamoto | |
| 2004/0012471 A1 | 1/2004 | Kojima et al. | |
| 2005/0077806 A1 * | 4/2005 | Schellenberg | 312/400 |
| 2006/0038070 A1 | 2/2006 | Henley et al. | |
| 2007/0176394 A1 * | 8/2007 | Gehring et al. | 280/420 |
| 2009/0212047 A1 | 8/2009 | Harman et al. | |
| 2011/0277489 A1 * | 11/2011 | Schalla et al. | 62/89 |
| 2012/0248245 A1 | 10/2012 | Schliwa | |

FOREIGN PATENT DOCUMENTS

| | | |
|---|---|---|
| DE | 4308144 C1 | 10/1994 |
| DE | 4344071 A1 | 7/1995 |
| DE | 19743313 C1 | 12/1998 |
| DE | 29816725 U1 | 1/1999 |
| DE | 19753467 A1 | 8/1999 |
| DE | 10103280 A1 | 8/2002 |
| DE | 10307081 A1 | 9/2003 |
| DE | 10218124 A1 | 11/2003 |
| DE | 10347561 B3 | 1/2005 |
| DE | 102004039372 A1 | 4/2005 |
| DE | 102006039808 A1 | 3/2008 |
| EP | 0260725 A2 | 3/1988 |
| EP | 0862524 A1 | 9/1998 |
| GB | 2383879 A | 7/2003 |
| WO | 2007/063500 A2 | 6/2007 |
| WO | 2010108775 A2 | 9/2010 |

OTHER PUBLICATIONS

Chinese Office Action for Application No. 201080052131.4 dated Oct. 20, 2014.

* cited by examiner

CARRYING SYSTEM FOR RECEIVING OF CONTAINERS IN A VEHICLE AND USE OF A CARRYING SYSTEM IN AN AIRCRAFT

CROSS-REFERENCE TO RELATED APPLICATIONS

The present application is a continuation of International Application No. PCT/EP2010/067561 filed on Nov. 16, 2010, which claims the benefit of the filing date of German patent application No. 10 2009 053 584.5, filed Nov. 17, 2009 and of U.S. Provisional Application No. 61/261,803, filed Nov. 17, 2009, the disclosures of which are incorporated herein by reference in their entireties.

TECHNICAL FIELD

The invention relates to a carrying system for a vehicle. The invention further relates to the use of such a carrying system in an aircraft.

BACKGROUND TO THE INVENTION

In vehicles used for transporting people, animals or freight, for the purpose of reducing the logistics expenditure during loading and unloading the vehicle it is common to use a carrying system with exchangeable containers and with receiving spaces that are suitable for accommodating the containers. In the containers, for example, goods to be transported or food to cater for passengers are/is accommodated.

For receiving all types of cargo, in particular in modern commercial aircraft larger containers in the form of cargo containers are used that comprise standardized dimensions, which containers prior to a flight are placed in a corresponding cargo compartment of the aircraft, and after the flight are removed again. For catering for passengers, frequently movable containers in the form of serving trolleys are used, which before and after a catering process are accommodated in suitable receiving spaces of aircraft galleys.

These two types of containers, which have been mentioned as examples, share a common characteristic in that they are moved very frequently and need to be brought into the vehicle from a location situated outside the vehicle, and need to be locked into place. At the same time, as a result of standardized dimensions, simplified logistics with very considerable flexibility in the use of such containers is provided, so that a multitude of different vehicles can be designed with any number of identical containers.

Apart from the actual purpose of storing whatever kind of items, the two container types mentioned as examples can also carry out additional tasks, for example the refrigeration of freight or of food. In trolleys that are presently in widespread use, for this purpose frequently a cold airstream, generated at a central location of the vehicle, is used for cooling. To this effect the trolleys comprise cooling air inlets through which the cold air can enter the respective trolley, in it can flow around food trays stored therein, before leaving the trolley through cooling air outlets. In order to ensure this refrigeration function it is thus necessary to slide a respective trolley into a receiving space provided for it, and to lock said trolley, so that a cooling air outlet in the receiving space is aligned with a cooling air inlet of the trolley. In the case of refrigeration of cargo in cargo containers that are arranged in a cargo compartment of the aircraft different refrigeration methods can be used, for example carrying along an adequate quantity of dry ice, or operating corresponding refrigerators in the cargo containers to be refrigerated, which refrigerators need to be connected, by way of plug-in connectors, to external current sources in the cargo compartment.

In order to obtain an unbroken refrigeration chain, during storage at a catering enterprise or transport enterprise both the trolleys and the cargo containers containing refrigerated cargo are refrigerated, wherein again cooling air or refrigerators is/are used.

Both establishing an aligned connection between a cooling air outlet and a cooling air inlet of a trolley, and establishing an electrical connection between an external current source and a connector socket of a freight container, is problematical in particular in the case of high frequency of usage and movement. With the use of any of a number of identical containers and the not always very gentle handling of these containers, it can often happen that containers that have been subjected to considerable wear and tear and that possibly have defective plug-in connectors are provided for use, which may have a detrimental effect on the quality of the cooling-air connection or the electrical plug-in connection. At the same time it should also be assumed that in the case of frequent use of electrical plug-in connectors impurities find their way into sockets, and consequently manual cleaning is required in order to be able to provide an adequately safe and reliable plug-in connection.

BRIEF SUMMARY OF THE INVENTION

There may thus be a need for a carrying system for a vehicle, which carrying system comprises at least one container and at least one receiving space designed to receive the container, that makes possible robust operation of any equipment in the containers with consistent quality of connection to equipment in the vehicle. This connection should be as unsusceptible as possible to external influences such as fluctuations in temperature and pressure, a soiled environment, and rough handling, while nevertheless ensuring reliable and safe energy transmission. One or more of these needs may be satisfied by the embodiments disclosed herein.

According to a first aspect the carrying system according to the invention comprises at least one container and at least one receiving space designed to receive the container, at least one primary winding with at least one first core, and at least one secondary winding with at least one second core. The container is adapted for being brought into the corresponding receiving space of the vehicle. Preferably, the primary winding and the first core are arranged in the receiving space, while the secondary winding and the second core are arranged on or in the container. The container and the position of the primary winding are designed so that when the container is properly in its place the secondary winding and the second core with the primary winding and the first core are aligned. Alignment refers to the primary winding and the secondary winding being directed towards each other and comprising a defined distance from each other.

As a result of this arrangement, when an alternating voltage is applied to the primary winding or to the secondary winding, a magnetic circuit is established between the primary winding and the secondary winding. By applying the alternating voltage, an alternating voltage is induced in the secondary winding which in the container can be applied to electrical consumers. The carrying system according to the invention thus makes it possible to receive a container and to supply electrical power to electrical equipment in this container without there being a need to establish a mechanical plug-in connection. As a result of the aligned arrangement of the primary winding and the secondary winding, when the container is brought to a predetermined position or to an end position in the receiving space, an electrical connection is automatically established which even with frequent movement, considerable signs of usage or signs of wear of the container does not experience any loss of quality.

To meet the task of receiving the container, the receiving space in the vehicle is matched to the respective container shape, wherein the container shape depends on the particular task of the container. As mentioned above, many different container shapes for storing food, cargo and the like for use in vehicles are imaginable, and consequently the central idea of the invention is not to be limited to a particular container shape or to a particular receiving space. Preferably, however, the receiving space comprises locking means that make it possible to lock the container in the receiving space so that alignment of the primary winding and of the secondary winding in the predetermined position or in an end position in the container remains ensured.

In a preferred embodiment of the transport system according to the invention the container comprises an electrically operable cooling device whose voltage input port is connected to the secondary winding. Sliding the container into its receiving space and alignment between the primary winding and the secondary winding, which are subjected to an alternating voltage, results in the establishment of a magnetic circuit, which results in operation of the cooling device arranged in the container. The container comprising a cooling device can be implemented in many different variants; merely as examples the trolley for serving passengers in a vehicle cabin, or the cooling container for accommodating cargo to be cooled are mentioned. In this arrangement the cooling device can be implemented in a host of different ways without limiting the subject of the invention to a particular type of cooling device. Apart from adsorption refrigerators, absorption refrigerators, compression refrigerators and thermoelectrical refrigerators, any other electrically operable refrigerators may also be considered.

Likewise, in an equally advantageous improvement of the carrying system according to the invention at least one electrically operable heating means can be accommodated in the container, which heating means is connected to the secondary winding. This makes sense in containers in which items are to be heated or kept hot, for example in the case of prepared meals in a trolley for catering for passengers.

In an equally advantageous improvement of the carrying system according to the invention the container comprises at least one cooling device and at least one heating means which are electrically operable and connected to the secondary winding. This makes it possible for the container to be able to both cool or heat the interior of the container. Consequently, in an alternating manner either items to be cooled or items to be heated or to be kept hot can be stored in this container. In principle this makes it possible for the container to furthermore also represent a transport option for live animals, because in particular in cargo compartments of aircraft, the temperature might otherwise be too low for the transport of animals.

In a likewise preferred improvement of the carrying system according to the invention an electrically operable air conditioning device is arranged in the container, which air conditioning device is connected to the secondary winding, and which apart from heating and cooling may also make possible at least the circulation or filtering of air within the container. In addition, the container may also comprise at least one air inlet and at least one air outlet for the delivery of fresh air and for the removal of stale air so that, in particular, an agreeable environment can be created for the transport of animals or for rest compartments or the like.

Likewise, in a preferred improvement of the carrying system according to the invention the container comprises an electrically operable illuminating device that is connected to the secondary winding and that illuminates the interior space of the container. In particular, this can create an agreeable environment for the transport of animals or for rest compartments or the like.

A preferred embodiment of the carrying system according to the invention comprises at least one switching unit that is adapted for starting up or shutting down one or several electrical consumers in a container. In this arrangement the switching unit may either be arranged within the container or on an outside of the container, which outside can be reached when the container is slid into a receiving space. In this arrangement the switching unit should primarily be used to establish or disconnect an electrical connection between the secondary winding and electrical consumers in the container. In addition, or as an alternative, to this, the switching unit may also be arranged at a location in the region of the receiving space so that, as a consequence, applying an alternating voltage to the primary winding can take place or can be stopped.

An equally preferred improvement of the carrying system according to the invention comprises a first control unit with a voltage input port, a data input port and a signal output port and at least one second control unit with a signal input port, a data output port and a voltage output port. The first control unit is adapted, from an electrical voltage present at the voltage input port, for creating an alternating voltage at the signal output port, with the frequency of said alternating voltage being modulated depending on the data arriving at the data input port. According to the present invention, the second control unit is adapted, from the frequency-modulated alternating voltage present at the signal input port, for demodulating the data and for providing it at the data output port. Furthermore, the second control unit is adapted for providing on the voltage output port a voltage that has been conditioned, for further use, in an electrical consumer.

Connecting the signal output port of the first control unit to the primary winding, and connecting the signal input port of the second control unit to the secondary winding, makes it possible to transmit data from a system on the vehicle side, which system conveys data to the first control unit, by way of the magnetic circuit between the primary winding and the secondary winding, to the second control unit on the container. By means of such a data connection it would be possible, for example, without switching off the primary winding or without activating a switching unit, to provide a possibility to convey a signal to an electrical consumer in the container, which signal results in switching on, switching off or changing an operating state.

By means of an additional arrangement of a primary winding with a first core in the container, and a secondary winding with a second core in a position of the receiving space, which position is suitable for alignment, electrical consumers, sensors or other equipment may at the same time establish a data connection, by way of a data connection directed analogously to the one directed into the container, in the other direction. In this manner the state of an electrical consumer, a temperature or the like can be conveyed in the form of data towards the outside. Apart from a data connection that acts merely unidirectionally, in this manner bi-directional data connections can also be established so that a container of the carrying system according to the invention is basically also in a position to be able to operate video surveillance, communication means and the like, without relying on electrical plug-in connections. The additional primary winding may be arranged so as to be adjacent to the secondary winding because at this position alignment between a primary winding and a secondary winding can already be achieved.

In a preferred embodiment of the carrying system according to the invention the container additionally comprises a primary winding with at least one first core that is arranged on one side of the container, which side is positioned opposite the side comprising the secondary winding and the second core. In this way the possibility of accommodating several containers one behind the other or one beside the other in a suitable receiving space may be created without having to equip the receiving space so that several primary windings and several first cores for supplying electrical power to several containers have to be provided. In this arrangement it would also be particularly advantageous to connect the additional primary winding in the container with the secondary winding in the container. Apart from conveying electrical power this would also provide the basic possibility of implementing a unidirectional data connection that by further pairing of a primary winding and a secondary winding may be extended to form a unidirectional data connection. On the side of the receiving space this would eliminate the requirement of a multitude of first control units for data modulation.

In a preferred improvement of the carrying system according to the invention the container is designed as a serving trolley for food and is suitable for use in a cabin of a vehicle for catering for passengers. There would be no need to provide an expensive mechanical interface for a cooling system.

In an equally preferred improvement of the carrying system according to the invention the container is designed as a cargo container with a cooling and/or a heating device, which cargo container can set a temperature that is predetermined for sensitive cargo.

In a further preferred embodiment of the carrying system according to the invention the container is designed as a rest compartment for accommodating persons, which rest compartment may comprise a cooling device, a heating means, an air conditioning device, an illuminating device, and/or communications means. Consequently, especially during long journeys, the cabin crew of a passenger transport aircraft can observe prescribed rest times, and fatigue can be prevented. By means of such movable or exchangeable rest compartments the vehicle can be prepared with simple means for an impending extensive journey, wherein, as an alternative, the rest compartment can make way for a cargo container or the like. There is no need to provide expensive mechanical and electrical connections to provide the basic functions within the rest compartment.

In a preferred embodiment of the carrying system according to the invention the receiving space is located in a vehicle galley and is designed to receive a serving trolley. In the vehicle galley a switching unit may be arranged that is used for switching on or off electrical consumers in the container.

In an equally preferred embodiment of the carrying system according to the invention the receiving space is a cargo compartment of a vehicle that is adapted for receiving cargo containers as containers. Under time pressure and spatially more difficult conditions there is no need to manually establish electrical connections so that a safe function of the electrical consumers arranged in the cargo container can be ensured even in the case of rough treatment of the cargo container or of the cargo compartment itself.

In addition it is preferred to combine primary windings and first cores in a compact primary element, and to combine secondary windings and second cores in a compact secondary element. This makes it possible to achieve particularly easy integration of primary windings and secondary windings in containers and in regions of receiving spaces.

In addition it would be particularly preferred to adapt the system according to the invention by means of an electronics device in such a manner that information relating to the occupation of a receiving space can be determined. After loading the vehicle with containers of whatever form, it would consequently be possible to detect the correct assignment and correct position of the containers, and to preferably display the aforesaid by way of a central display unit. From a technical point of view this may be determined by way of the changed resonance behavior and the corresponding current flow of the intercommunicating appropriate primary windings and secondary windings. After activation of the primary coils, the electronics unit may detect a changed resonance behavior or a current flow and display the aforesaid in the display unit. During loading this function assists in monitoring whether loading has taken place completely and correctly, and whether the current supply is ensured.

The requirement may, furthermore, be met by an aircraft comprising at least one such carrying system. The receiving space may be designed as a cargo compartment for receiving containers in the form of cargo containers. The cargo containers comprise secondary windings that can be connected to one or several primary windings in the cargo compartment. Likewise the aircraft may also comprise at least one receiving space in a galley, which receiving space is designed for receiving serving trolleys as containers. Corresponding secondary windings in serving trolleys can then combine with primary windings in the receiving space. Consequently, for example, cooling of food, keeping food hot, or even heating up food would be imaginable so that it is no longer necessary to have to provide cooling air in the receiving space. As already mentioned above, the cooling devices may be implemented in a host of different ways without limiting the subject of the invention to the aforesaid.

Furthermore, the need is also met by the use of a carrying system according to the invention according to the preceding description in an aircraft.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1A:
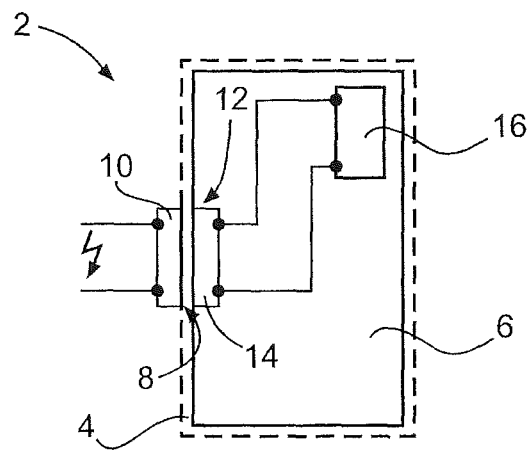
FIGS. 1a, 1b and 1c diagrammatically show basic exemplary embodiments of the system according to the invention.

FIG. 1a shows a basic carrying system 2 according to the invention, which carrying system 2 comprises a receiving space 4 and a container 6 that can be arranged in the receiving space 4. On a delimiting surface 8 of the receiving space 4 a primary element 10 is arranged that comprises a primary winding and a first core. On the container 6 on a delimiting surface 12 a secondary element 14 is arranged that comprises a secondary winding (not shown in detail) and a second core. Positioning of the secondary element 14 matches positioning of the primary element so that the primary element 10 and the secondary element 14 are aligned with each other as soon as the container 6 is completely slid into the receiving space 4.

As soon as an alternating voltage is present on the primary element 10, a voltage is induced in the secondary winding of the secondary element 14. This voltage can be applied to an electrical consumer 16 by means of an electrical connection.

This results in the technical effect that no electrical plug-in connection between the container 6 and a delimiting surface 8 of a receiving space 4 is required in order to operate electrical consumers 16 in a container 6. Even fairly rough handling of the container 6, any falls or damage, or exposure to a soiled environment, do not result in impairment of the electrical connection.

Figure 1B:
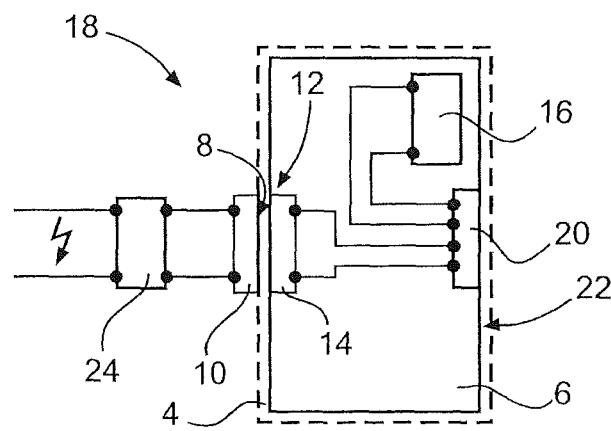

FIG. 1b shows a carrying system 18 according to the invention that represents a slight modification of the carrying system 2 according to the invention of FIG. 1a. In addition to the already described elements, the carrying system 18 according to the invention comprises a switching unit 20 in the interior of the container 4, which switching unit 20 is designed to cause or to stop operation of the electrical consumer 16. For this purpose the switching unit 20 is, as an example, arranged at a front 22 of the container 4, which facilitates operability. However, it depends entirely on the type of container whether the switching unit 20 can be operated from the outside, wherein this may be more likely to be the case in serving trolleys for catering for passengers in a passenger cabin than in the design of the container 6 as a cargo container for a cargo compartment of a vehicle. As an alternative or in addition to the above, for this reason a further switching unit 24 may be connected to the primary element 10, which switching unit 24 can establish or interrupt the supply of the primary element 10 with an electrical voltage.

Figure 1C:
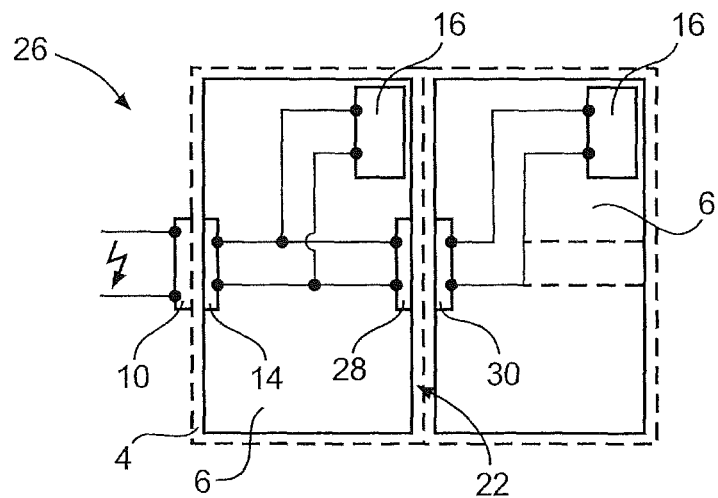

FIG. 1c shows a further modification in the form of a carrying system 26 according to the invention, in which carrying system 26 two containers 6 can be arranged in a shared receiving space 4, for example arranged one behind the other. The special characteristic of this exemplary embodiment consists of only one single primary element 10 being provided in the receiving space 4, and transmission of the electrical power being provided by a combination of an additional primary element 28 and an additional secondary element 30 in the two containers 4. Preferably, the additional primary element 28 is located on the side 22 of the container 6, which side 22 faces away from the primary element 10 or from the delimiting surface 8 of the receiving space 4.

Figure 2A:
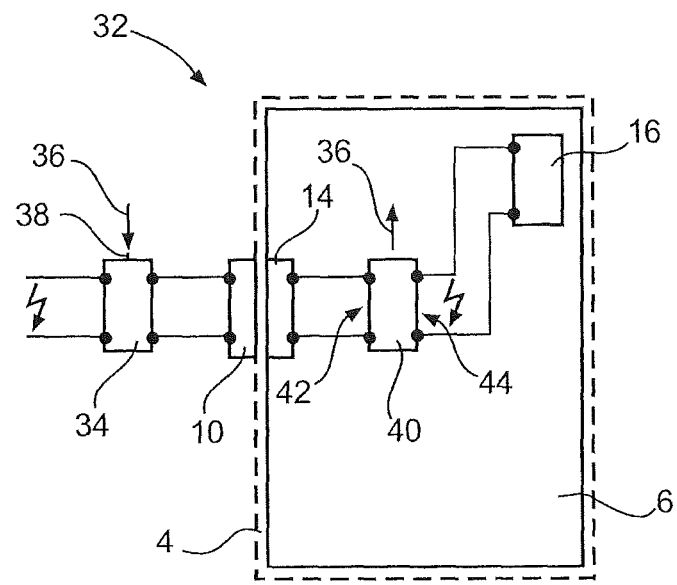
FIGS. 2a and 2b show further exemplary embodiments of the carrying system according to the invention with an additional data connection.
Figure 2B:
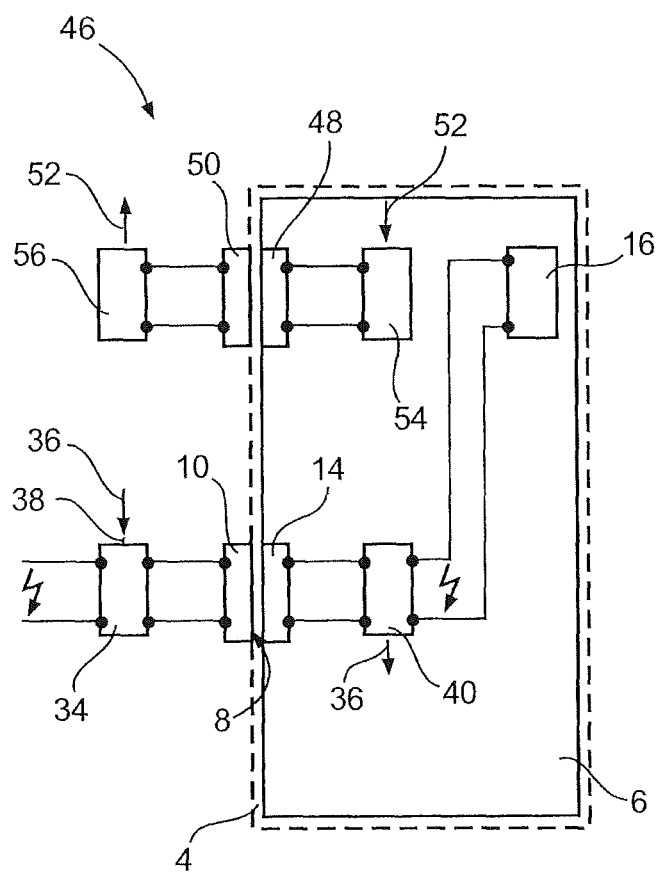

FIG. 2a shows an exemplary embodiment of a carrying system 32 according to the invention, in which the primary element 10 is connected to a first control unit 34. The control unit 34 is designed to receive data 36 by way of a data input port 38, and to modulate, depending on the incoming data 36, an alternating voltage present at the first control unit 34 by way of a data input port 38, and to transmit it to the primary element 10. In the container 6 there is a second control unit 40, which is connected to the secondary element 14 and is designed from the modulated alternating voltage present at a signal input port 42 to extract the data 36 again and to transmit a voltage, by way of a voltage output port 44, to an electrical consumer 16. This makes it possible to implement a unidirectional data connection by way of the combination comprising the primary element 10 and the secondary element 14 so that in this manner, for example, simple control tasks may be used for switching the electrical consumer 16 on or off, or for passing on operational parameters.

In a modification in the form of a carrying system 46 according to the invention, by means of an additional primary element 48 in the container 6 and an additional secondary element 50 on the delimiting surface 8 of the receiving space 4 the option is provided of transmitting data 52 from any data source within the container 6 by way of an additional first control unit 54 to an additional second control unit 56. In this manner, bi-directional communication or data transmission with any installations in the container 6 may be carried out, which makes it possible, for example, to monitor operating states of electrical consumers 16, but may also prove useful in the use of a container 6 as a rest compartment with means of communication for persons present in said container 6.

Figure 3A:
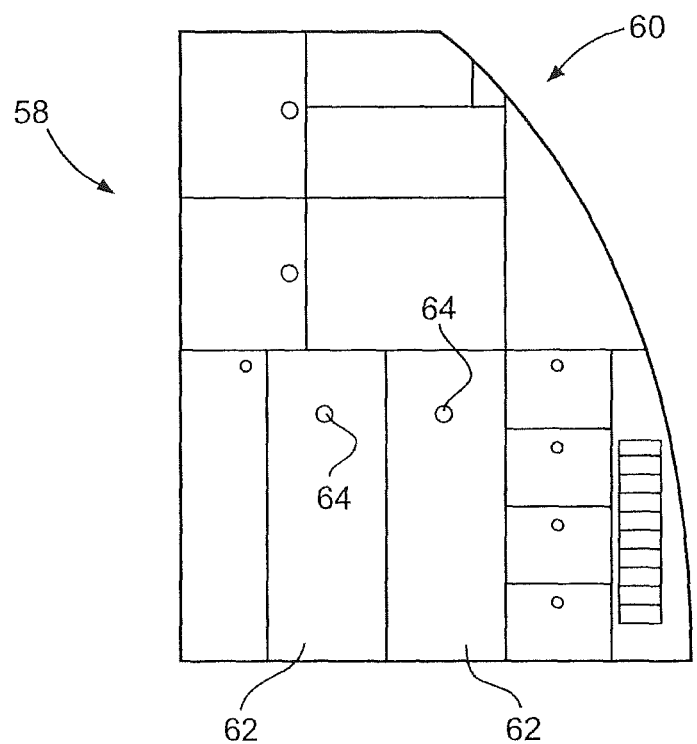
FIGS. 3a and 3b show a galley and a serving trolley.

FIG. 3a shows, as an example, a carrying system 58 according to the invention, which carrying system 58 is integrated in a galley 60. The illustration shows, as an example, two receiving spaces 62, each comprising a primary element 64, into which receiving spaces 62, for example, serving trolleys 66 of standardized dimensions from FIG. 3b can be pushed.

Such a serving trolley 66 comprises, as an example, a secondary element 68 arranged in such a manner that with the serving trolley 66 slid into place in a receiving space 62 a primary element 64 aligns with the secondary element 68 and consequently a cooling device 70 or some other electrical consumer may be operated.

In an exemplary embodiment the cooling device 70 may circulate air within the serving trolley 66, and by means of a corresponding device, for example a Peltier element, a compression refrigerator or the like, may cool the aforesaid. The circulating air flows around trays or the like arranged in the serving trolley 66, and consequently cooling is caused.

Figure 4A:
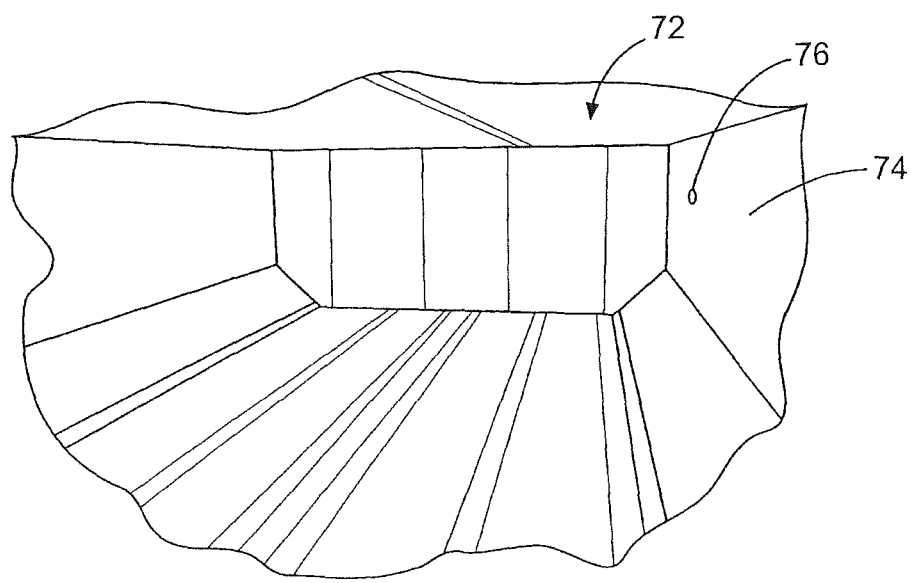
FIGS. 4a and 4b show a cargo compartment of an aircraft and a cargo container.
Figure 4B:
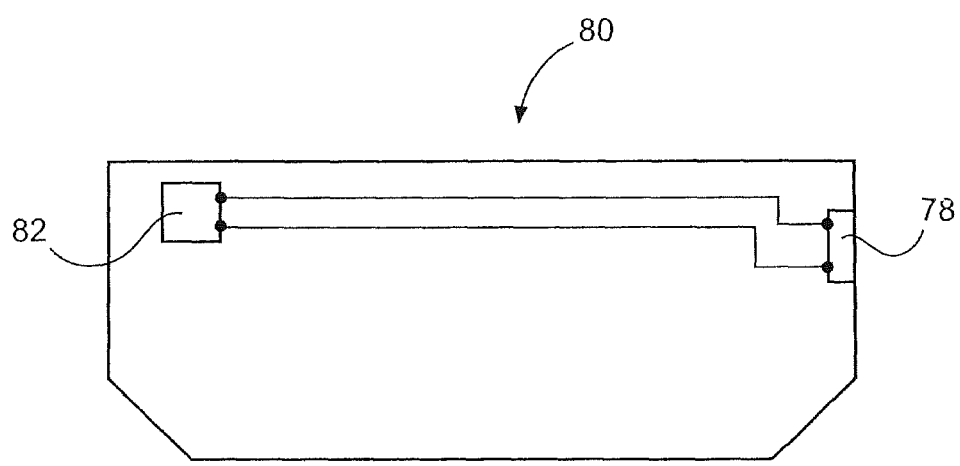

Furthermore, FIGS. 4a and 4b show a cargo compartment 72 of an aircraft, in which on a delimiting surface 74, as an example, a primary element 76 is arranged that is aligned with a corresponding secondary element 78 of a cargo container 80 of FIG. 4b. FIG. 4b shows, as an example, a cooling device 82 that is connected to the secondary element 78. Such an arrangement makes it possible to effect cooling of cargo within a cargo container 80, which cooling preferably commences directly after the cargo container 80 has been slid into the cargo compartment 72 as a receiving space.

Figure 5A:
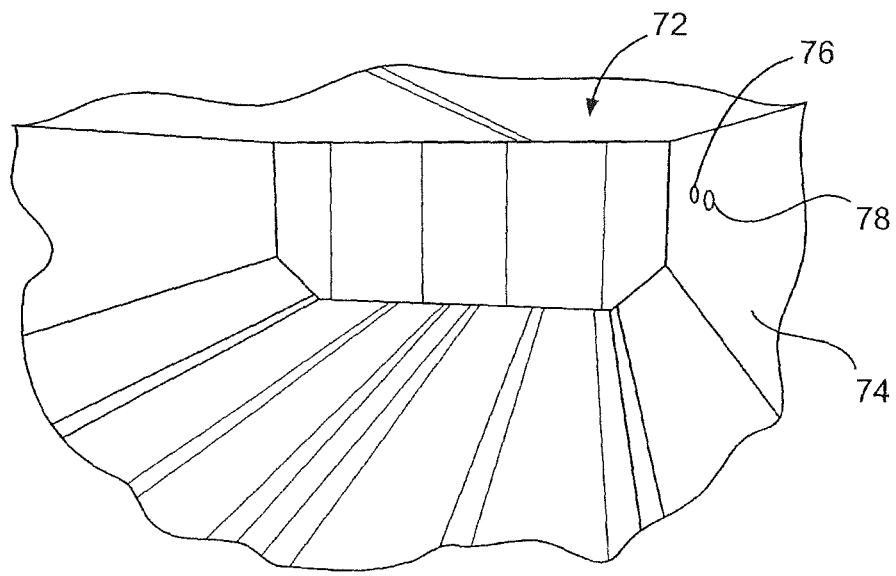
FIGS. 5a and 5b show a cargo compartment of an aircraft and a movable rest compartment.
Figure 5B:
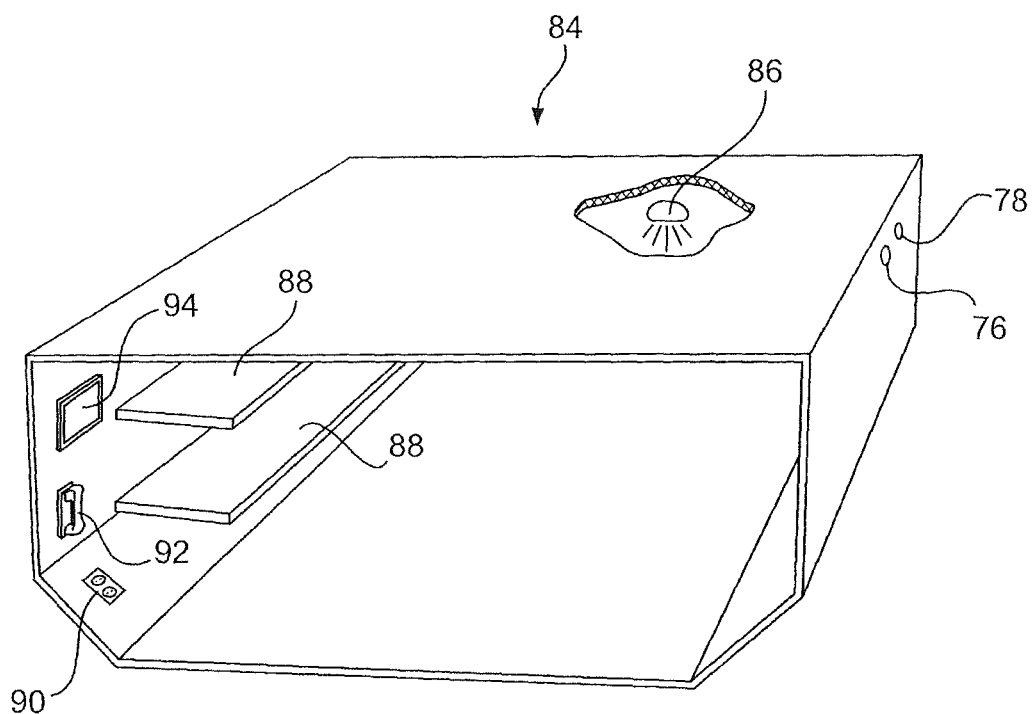

Furthermore, FIGS. 5a and 5b show the cargo compartment 72 of an aircraft, in which on the delimiting surface 74, as an example, a primary element 76 and a secondary element 78 are arranged. The cargo compartment 72 is designed to receive a movable rest compartment 84 on which a secondary element 78 and a primary element 76 are arranged, which correspond to the primary element 76 or to the secondary element 78. As an example, an illuminating device 86, two beds 88, an electrical outlet 90, a telephone 92 and a display unit 94, for example in the form of a monitor, are shown, which can all, by way of the primary element 76 of the vehicle space 72 and the secondary element 78 of the movable rest compartment 84, be supplied with electrical current and with data from a data source located outside the movable rest compartment 84. Communication of the telephone 92 can take place in a bi-directional manner in that outgoing voice information is transmitted by way of the additional primary element 76 of the movable rest compartment 84 into the additional secondary element 78 of the cargo compartment 72. In order to handle data connections with a relatively high data rate of, for example, more than 100 Kbit, it would make sense to effect the entire communication by way of the additional primary element 76 and the additional secondary element 78, or by way of two pairs of additional primary elements 76 and secondary elements 78.

The movable rest compartment 84 may also be implemented in the form of a rest compartment comprising other installations.

Figure 3B:
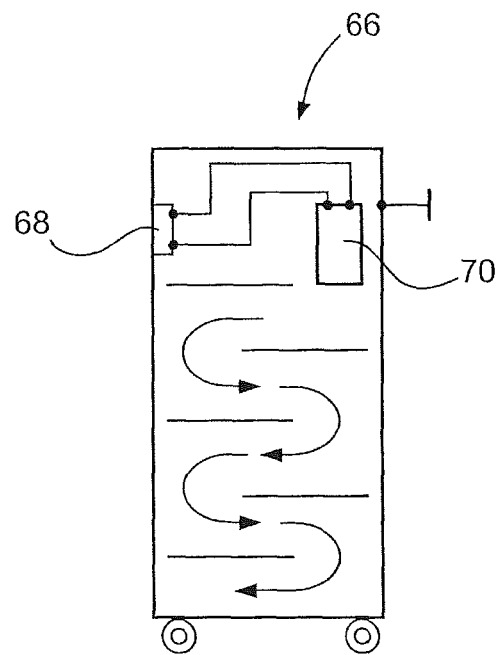
Figure 6A:
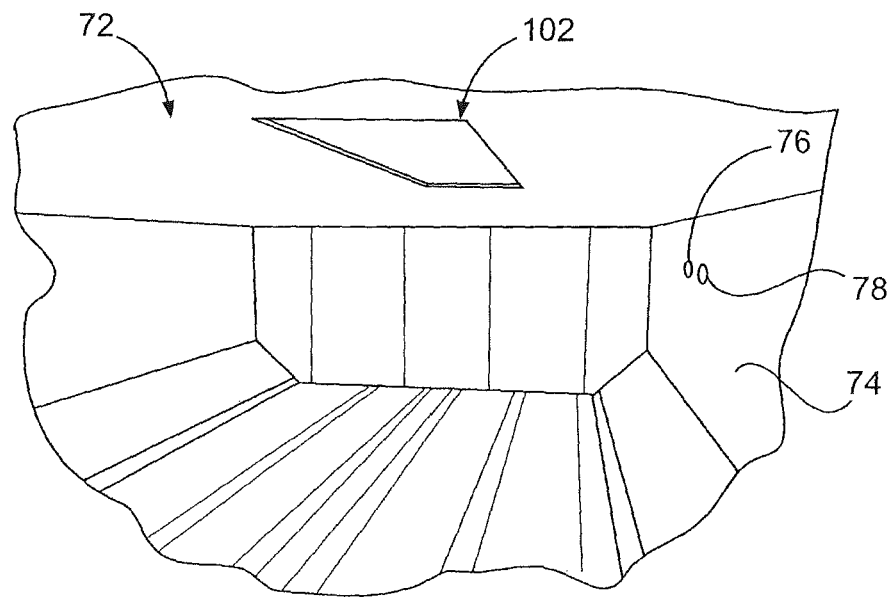
FIGS. 6a and 6b show a cargo compartment of an aircraft and a galley with an elevator for serving trolleys.
Figure 6B:
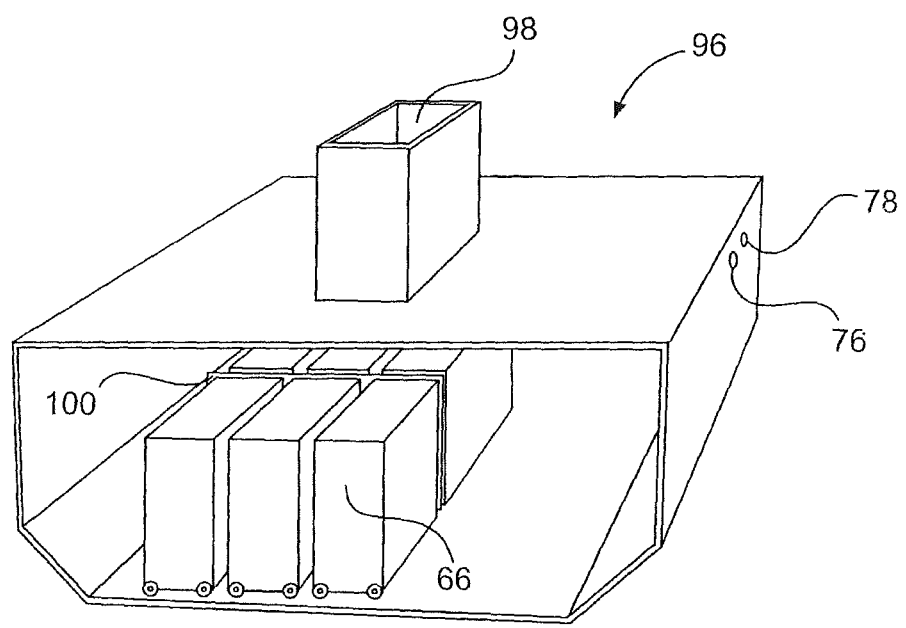

Furthermore, FIGS. 6*a* and 6*b*, as examples, show a cargo compartment 72 and a container 96 designed for receiving serving trolleys 66 that can be conveyed, by way of an elevator 98 by way of a cabin floor opening 102, into a passenger cabin. The serving trolleys are, as an example, locked to a wall element 100 and correspond by way of primary elements and secondary elements, as shown in FIGS. 3*a* and 3*b*, to an electrical power supply.

Figure 7:
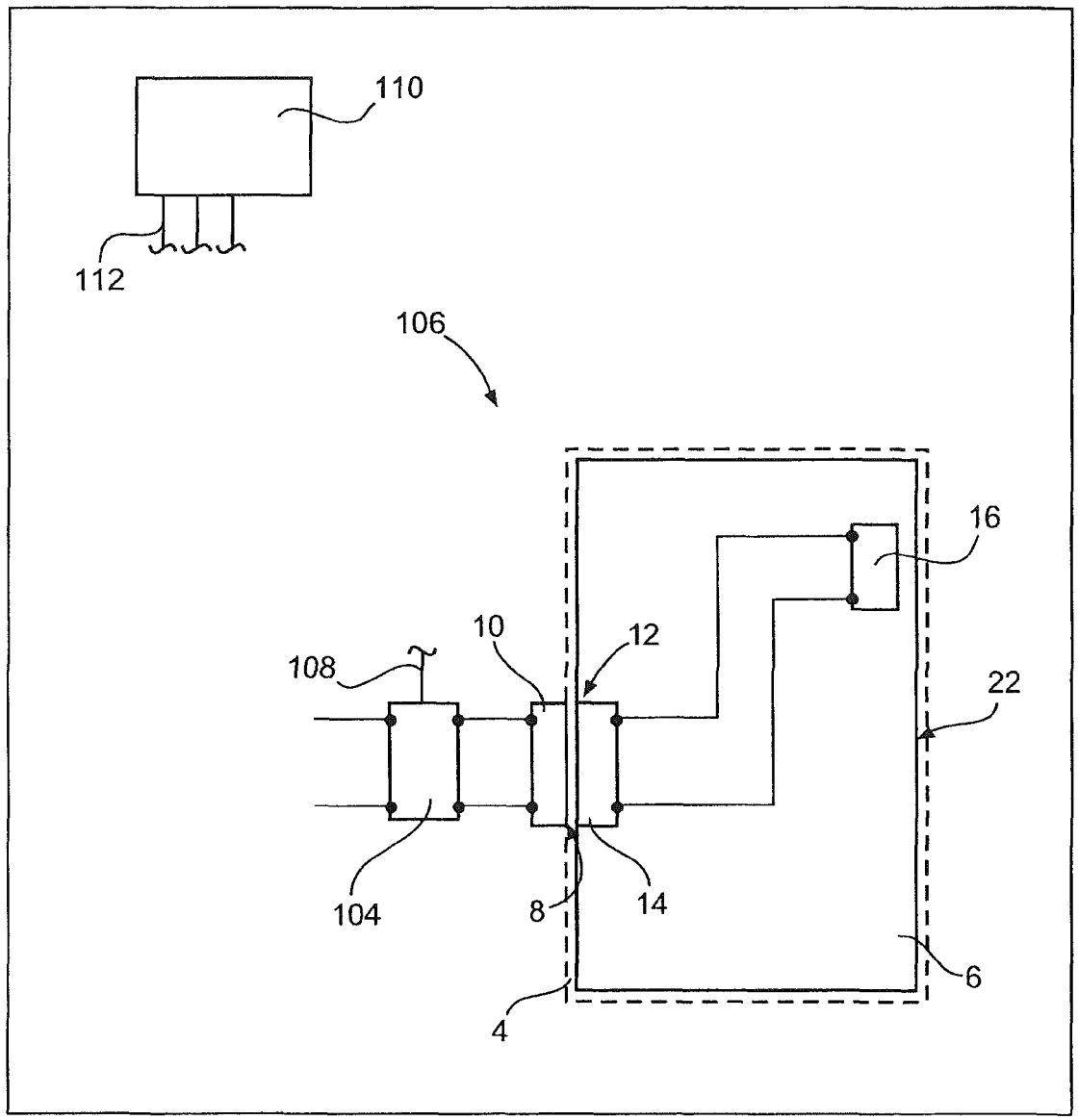
FIG. 7 diagrammatically shows a further basic exemplary embodiment of the system according to the invention.

Finally, FIG. 7 shows a carrying system 106 according to the invention, which carrying system 106 is characterized by an electronics unit 104 that by changing the electrical characteristics of the primary element 10 can detect a connection with a secondary element 14. By means of a signal output port or data output port 108 this state can be transmitted to a display unit 110 which for this purpose comprises a number of signal input ports or data input ports 112. In this manner during loading of a vehicle, a loading display can be implemented that in an easy way can document the proper function of the electrical consumers 16 in the containers 6 and their correct positions.

The illustration of the cargo compartment 72 is shown as an example in FIGS. 4*a* to 6*b*. However, some other receiving space for receiving movable containers for persons is possible, which receiving space is arranged in a region of a passenger cabin.

Figure 8:
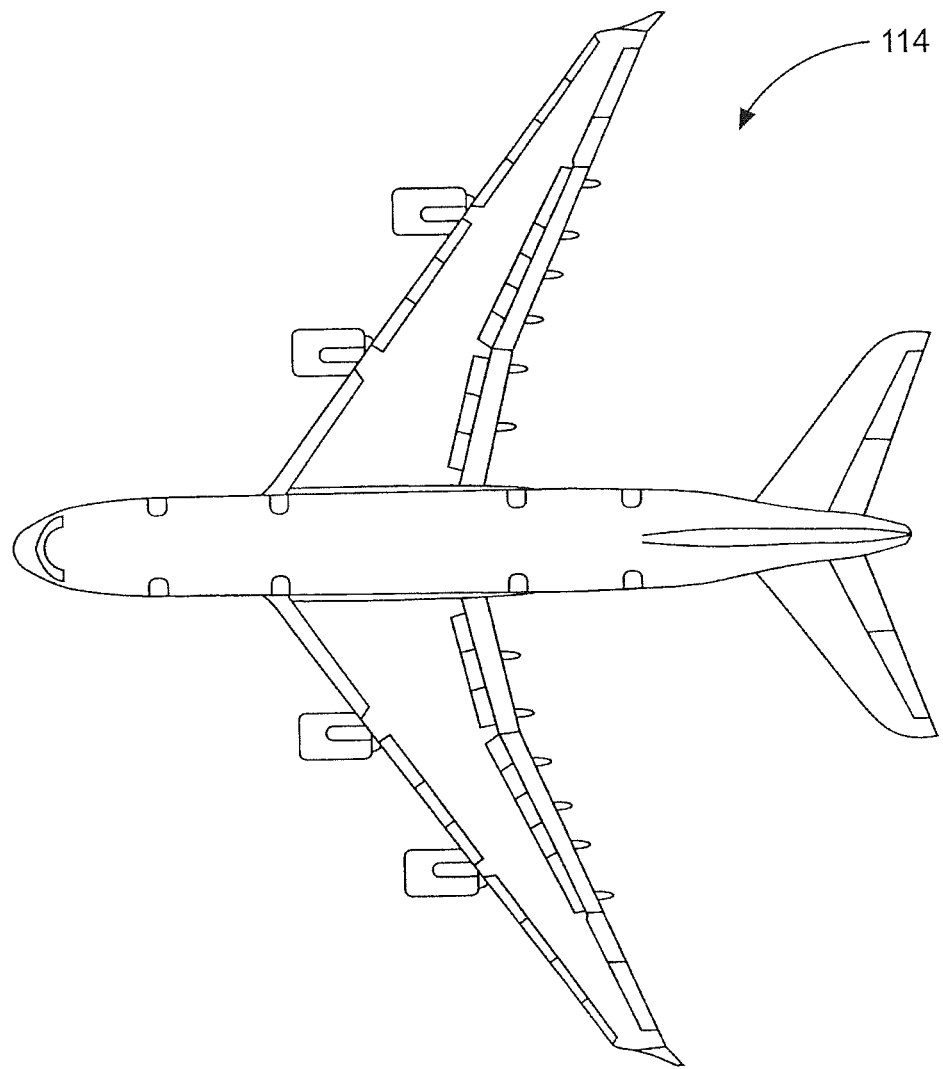
FIG. 8 shows an aircraft with at least one carrying system according to the invention.

Finally, FIG. 8 shows an aircraft comprising at least one carrying system according to the invention.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Carrying system
4 Receiving space
6 Container
8 Delimiting surface
10 Primary element
12 Delimiting surface
14 Secondary element
16 Electrical consumer
18 Carrying system
20 Switching unit
22 Front
24 Switching unit
26 Carrying system
28 Primary element
30 Secondary element
32 Carrying system
34 Control unit
36 Data
38 Data input port
40 Control unit
42 Signal input port
44 Voltage output port
46 Carrying system
48 Primary element
50 Secondary element
52 Data
54 First control unit
56 Second control unit
58 Carrying system
60 Aircraft galley
62 Receiving space
64 Primary element
66 Serving trolley
68 Secondary element
70 Cooling device
72 Cargo compartment
74 Delimiting surface
76 Primary element
78 Secondary element
80 Cargo container
82 Cooling unit
84 Rest compartment
86 Illuminating device
88 Bed
90 Electrical outlet
92 Telephone
94 Display unit
96 Container
98 Elevator
100 Wall element
102 Cabin floor opening
104 Electronics unit
106 Carrying system
108 Signal or data output port
110 Display unit
112 Signal or data input port
114 Aircraft

The invention claimed is:

1. A carrying system for receiving crew rest compartments in a vehicle, comprising:
at least one crew rest compartment having a predetermined shape and comprising at least one compartment for removably accommodating at least one of an item, an animal or a human being;
a plurality of walls in the vehicle defining a receiving space configured to receive the at least one crew rest compartment;
at least one electrical consumer arranged in the at least one crew rest compartment; and
at least one primary winding in a first core and at least one secondary winding in a second core;
wherein the secondary winding is arranged in the at least one crew rest compartment, and the primary winding is attached on the vehicle side on a surface delimiting the receiving space in such a manner that a predetermined movement of the at least one crew rest compartment into the receiving space results in alignment of the primary winding and the secondary winding with one another;
wherein the primary winding and the secondary winding are adapted for inducing into the secondary winding an alternating voltage present at the primary winding; and wherein the electrical consumer is connected to the secondary winding and comprises at least one of a cooling device, a heating device, an air-conditioning device, and an illuminating device for illuminating the at least one compartment.

2. The carrying system of claim 1, further comprising at least one switching unit for interrupting the connection between the electrical consumer and the secondary winding.

3. The carrying system of claim 1, further comprising at least one switching unit for interrupting the connection between the primary winding and a voltage source.

4. The carrying system of claim 1, further comprising:
at least one first control unit with a voltage input port, a data input port and a signal output port,
at least one second control unit with a signal input port, a data output port and a voltage output port;
wherein the primary winding is connectable to the signal output port of the first control unit, and the secondary winding is connectable to the signal input port of the second control unit, the first control unit is adapted, from an electrical voltage present at the voltage input port, for creating an alternating voltage at the signal output port, with the frequency of said alternating voltage being modulated depending on the data arriving at the data input port, and the second control unit is adapted, from the modulated alternating voltage present at the signal input port, for demodulating the data and to provide it at the data output port.

5. The carrying system of claim 4, wherein the electrical consumer is adapted for being controlled by the data.

6. The carrying system of claim 4, further comprising for transmitting data to the outside,
a second first control unit and a second primary winding arranged in the crew rest compartment;
a second second control unit and a second secondary winding configured to be affixed on the vehicle side.

7. The carrying system of claim 1, further comprising at least one electronics unit connectable to at least one primary winding or at least one secondary winding, which electronics unit is adapted for detecting a connection between a primary winding and a secondary winding, and for providing a signal or data relating to the status of connection by way of a signal or data output port.

8. The carrying system of claim 7, further comprising at least one display unit that is connectable to at least one electronics unit for issuing at least one status of connection of at least one primary winding and of a corresponding secondary winding.

9. An aircraft with at least one receiving space and at least one carrying system for receiving at least one crew rest compartment, the carrying system comprising:
at least one crew rest compartment having a predetermined shape and comprising at least one compartment for removably accommodating at least one of an item, an animal or a human being;
at least one electrical consumer arranged in the crew rest compartment and comprising at least one of a cooling device, a heating device, an air-conditioning device, and an illuminating device for illuminating the at least one compartment;
a plurality of walls in the vehicle defining a receiving space configured to receive the at least one crew rest compartment;
at least one primary winding in a first core and at least one secondary winding in a second core;
wherein the secondary winding is arranged in the at least one crew rest compartment, and the primary winding is attached on the vehicle side on a surface delimiting the receiving space in such a manner that a predetermined movement of the at least one crew rest compartment into the receiving space results in alignment of the primary winding and the secondary winding with one another;
wherein the primary winding and the secondary winding are adapted for inducing into the secondary winding an alternating voltage present at the primary winding; and
wherein the electrical consumer is connected to the secondary winding.

\* \* \* \* \*